United States Patent [19]

Bauer

[11] 4,190,070
[45] Feb. 26, 1980

[54] METHOD AND APPARATUS FOR CONTROLLING FLOW OF LIQUID IN GRAVITY FLOW CONDUITS

[76] Inventor: William J. Bauer, 422 S. Park Rd., LaGrange, Ill. 60525

[21] Appl. No.: 857,400

[22] Filed: Dec. 5, 1977

[51] Int. Cl.² .......................... F17D 3/00; F16K 31/22
[52] U.S. Cl. ...................................... 137/15; 137/433; 137/398
[58] Field of Search ................. 137/15, 398, 430, 433, 137/408

[56] References Cited

U.S. PATENT DOCUMENTS

| 932,375 | 8/1909 | Davis | 137/398 |
|---|---|---|---|
| 2,844,254 | 7/1958 | Ansley | 137/398 |
| 2,920,641 | 1/1960 | Girolo | 137/430 |
| 3,080,879 | 3/1963 | Danel | 137/433 |
| 3,522,013 | 7/1970 | Borgeson | 137/430 |
| 3,760,837 | 9/1973 | Amren | 137/433 |
| 3,939,066 | 2/1976 | Bauer | 210/6 |
| 4,083,661 | 4/1978 | McPherson et al. | 137/433 |

OTHER PUBLICATIONS

St. Anthony Falls Laboratory, "Conduits and Associated Cavitation", University of Minnesota, for Environmental Protection Agency, Jun. 1971.
Bauer Engineering, Inc., "Final Report Drop Shaft Investigation for Crosstown Expressway (I-494)", Oct. 1971.

Primary Examiner—Martin P. Schwadron
Assistant Examiner—G. L. Walton
Attorney, Agent, or Firm—Neuman, Williams, Anderson & Olson

[57] ABSTRACT

Method and apparatus for automatically controlled conducting of liquid downward through a gravity-flow subatmospheric-pressure shaft over a wide range of flow rates by use of a movable float-operated inlet valve with variable upward force being applied to the movable valve assembly to compensate for the variable downward forces resulting from the development of a partial vacuum in the flow shaft.

28 Claims, 3 Drawing Figures

METHOD AND APPARATUS FOR CONTROLLING FLOW OF LIQUID IN GRAVITY FLOW CONDUITS

BACKGROUND OF THE INVENTION

1. Field of the Invention

This invention relates generally to improvements in hydraulic methods and apparatus for conducting liquid downward through a gravity-flow subatmospheric-pressure shaft and more particularly concerns the use of an automatically controlled inlet valve assembly and a subatmospheric-pressure shaft to hydraulically conduct liquid by gravity flow from a first elevation to a lower elevation.

A system involving the present invention finds wide application in the field of liquid transport.

2. Description of the Prior Art

A related hydraulic system employing a subatmospheric-pressure shaft for conducting liquid downward by gravity flow is disclosed in U.S. Pat. No. 3,939,066 as part of a method and apparatus for treating solids in sewage material. A study of subatmospheric-pressure vertical shaft flow also was conducted by others at the St. Anthony Falls Hydraulic Laboratory of the University of Minnesota, as reported in "Hydraulics of Long Vertical Conduit and Associated Cavitation", under Contract EPA 14-12861 with the Environmental Protection Agency of the United States Government.

Another system has recently been proposed for conducting overflow sewage material from a near surface sewer system to a lower or so-called "deep tunnel" system for temporary storage by the Metropolitan Sanitary District of Chicago, Illinois. The deficiencies of known systems involving an atmospheric-pressure gravity-flow shaft are well illustrated by the latter proposed overflow system.

Combined sewers serving metropolitan areas and carrying human and industrial waste and runoff from the precipitation become overloaded during storm periods and previously discharged directly into streams and other waterways without any treatment. In the noted Chicago plan for solving the problem of overflows of combined sewers during runoff, tunnels constructed deep underground in rock strata, e.g., at a depth of 200 or more feet, receive the overflows and conduct them to places of temporary storage at a lower elevation, from which the overflows can be pumped at a later, more convenient time to sewage treatment plants. This plan is markedly less expensive than the use of separate storm and sanitary sewers and much more effective in managing the pollution associated with these overflows. The benefits of such a plan stem in part from the use of the natural structural properties of the pre-existing, sound underground rock for construction of economical tunnels and from the avoidance of nearly all of the above ground disruption that near surface plans entail.

In such a tunnel plan, conduit shafts are used to connect the near surface sewer system to the tunnels. These conduit shafts or pipes generally fall into either of two categories. The first type of shaft employed in such a plan is an atmospheric pressure shaft and is designed to entrain air from the atmosphere as an inherent part of the process of conducting the sewer overflow from the higher to the lower elevation. It will be appreciated that this overflow is highly liquid, being primarily water with a small percentage of solids and/or other liquids in solution or suspension. For convenience, this medium will sometimes simply be referred to as "water" or "liquid" hereinafter.

With an atmospheric pressure shaft, both air and water are conveyed downward. At the bottom of the shaft, the air is separated from the water and is then returned back to the top of the shaft. One proposed type of shaft is generally divided by a slotted partition into two parts, one part for conducting a mixture of air and water to the base of the shaft and then into a pool where the air and water separate, and the other part for venting the air in the pool back up to the top of the shaft. Much of the air induced into the mixture of air and water passing downward in one part of the shaft is entrained in the falling water after passing through the slots in the partition between the two parts of the atmospheric pressure shaft. Such an aerated system requires conduits of adequate size to convey the air downward along with the water, provision of space and/or facilities to separate the air from the water at the lower terminus, and provision for conducting the air back toward the surface. A considerable amount of space and of the cost of construction of an atmospheric pressure shaft is allocated to the movement of air through the system in a cyclical manner. Thus relatively large, complex and costly installations are required.

The second type of shaft for possible employment in the tunnel plan is a subatmospheric pressure shaft which is designed deliberately to exclude entry of air, thus avoiding the problem of handling large volumes of air and permitting a large reduction in shaft size, simplification of the design and reduction in cost. Such a shaft is illustrated in U.S. Pat. No. 3,939,066. Generally, a system employing a subatmospheric pressure shaft involves a reservoir which is fed with liquid, a shaft extending downwardly from the base of the reservoir to a plunge pool, and some form of a control valve in the reservoir which controls the flow of the sewage material from the reservoir into the shaft in a manner to preclude entry of air into the shaft. The plunge pool is designed to dissipate the kinetic energy of the liquid exiting from the shaft. The liquid is then conducted from the plunge pool, e.g., for temporary storage in the underground tunnels and reservoirs in the aforenoted sewage handling system.

In the latter system, liquid enters the inlet reservoir and fills up the volume thereof surrounding the control valve. When the liquid level in the reservoir rises to a sufficient depth to submerge the valve which is seated on the base of the reservoir and blocks the inlet of the shaft and to thereby prevent the entry of air into the subatmospheric pressure shaft when the valve is opened, the valve is lifted from its seat thereby permitting the liquid to flow into the shaft. The liquid then flows into the unvented air space within the shaft and drops down the shaft. The small amount of air contained in the shaft is carried with the liquid toward the bottom of the shaft and vented, and a vacuum is built up within the shaft. As this vacuum increases in strength, it produces an increased pressure differential across the opening of the inlet of the shaft, thus increasing the flow rate into the shaft.

The hydraulic zones of flow with the latter system are as follows: a zone of relatively low velocity of flow of sewage material in the inlet reservoir flowing downward toward the space created by the upward movement of the control valve; a zone of rapid acceleration in the vicinity of this space in which the velocity of the flowing sewage material accelerates to, for example, about fifty feet per second as a result of the combined pressure differential or head of, for example, 10 feet upstream from this space plus the roughly 30 feet of vacuum in the subatmospheric pressure shaft under optimum conditions, making a total pressure head differential across this space on the order of 40 feet; a zone of flow in the upper portion of the shaft which conveys a mixture of sewage material, water vapor, and various gases which have come out of solution in the sewage material as a result of the vacuum condition existing in the shaft; and a zone of flow in the lower portion of the shaft which conveys principally liquid sewage material, with no water vapor, but with some of the gases still entrained as bubbles as the process of redissolution continues. Normal atmospheric pressure creates a back pressure at the lower end of the shaft which is equivalent to about 30 feet of water and which causes the liquid to fill that portion of the conduit, and thereby exclude air from entering the system at the lower end.

The foregoing hydraulic zones of flow exist under equilibrium conditions when the flow is less than the maximum or design flow capacity of the system, as determined by the restriction at the inlet or control valve. Under equilibrium conditions with the flow equal to the maximum design flow capacity of the system, the hydraulic zones of flow are simply those of water (without the water vapor cavity in the upper part of the shaft) flowing under the total head differential represented by the difference in elevation head between the free surface in the inlet reservoir and the piezometric level or pressure in the connecting tunnel. All available elevation head is used for friction loss and velocity head. The inlet would be fully open under these conditions but with the pool in the inlet reservoir maintaining submergence to exclude air.

It will be appreciated that the high velocities and hence high rates of flow attained with the aforedescribed system are dependent upon excluding air from the inlet. This is accomplished by submergence of the intake through control of the inlet valve opening. If no inlet valve were to be used, and if the flow rate of sewage material down the shaft through the subatmospheric pressure shaft is greater than exceeds the flow rate of sewage material entering the reservoir from the sewer system, then the liquid level in the inlet reservoir will fall. If this condition persists, air will be drawn into the shaft. Under such conditions, the pressure within the inlet of the shaft would approach atmospheric, and the flow rate of sewage material down the shaft would decrease dramatically. Then the level of sewage material in the inlet reservoir would again rise until the intake was submerged and entrained air in the shaft was educed by the falling stream and until a vacuum thus was again created in the upper part of the shaft. Then the flow rate of sewage material through the shaft would again increase. This surging or unsteady flow cycle would continue indefinitely, so long as the intake opening permitted flow rates under the vacuum flow condition exceeding the current flow rate into the upper reservoir. Such hydraulic instability is a principal problem of uncontrolled subatmospheric pressure shafts.

Unsteady flow of this type is undesirable, particularly in such large structures as are involved in this invention. Such flow causes vibrations in the various parts of the structure and also surges of flow in the system. It is not considered good engineering practice to tolerate such vibrations and surges in large hydraulic structures, if they can be avoided.

By control of the inlet valve opening, the vacuum flow condition can be maintained in steady state or equilibrium to maintain the desired flow conditions and high flow rates over a wide range of flow rates. The rate at any time should correspond to the rate of inflow to the inlet reservoir with sufficient correspondence to avoid venting of the intake opening at one extreme or overflow at the other. However, it will also be appreciated that in the type of use alluded to above, the inflow rate can vary dramatically. Thus, automatic adjustment of the control valve is desirable. A float control valve is an approach to providing this control. If the increase flow rate of liquid entering the subatmospheric pressure shaft is greater than the flow rate of sewage material entering the reservoir from the sewer system, then the level of liquid in the inlet reservoir falls, and the float control valve lowers, thereby decreasing the intake opening and decreasing the flow rate into the shaft until an equilibrium is again established. Conversely, if the inflow rate increases, the liquid level and the float rise, thereby tending to open the valve to another equilibrium condition. Thus, the float control can control the flow rate entering the shaft in a manner to maintain submergence and prevent venting of air into the shaft, and thus to maintain steady, predictable high rates of flow down the unvented conduit and into the tunnel at the lower level over a wide range of flow rates.

However, a simple float operated valve does not solve the surging problem, but rather may enhance the surging effect. As a vacuum develops in the conduit, a concomitant downward force is exerted on the control valve, and on any related movable structure, tending to offset the effect of the buoyancy of the float control. This would cause the float to move downward to gain additional buoyancy for an equal upward force. Although the additional submergence might require only relatively slight downward movement, the amount of motion is often sufficient to close the initial opening of the control valve, thereby stopping flow of liquid into the conduit. Thus, there would be a series of surges of liquid flow into the shaft, a situation which the system was intended to eliminate.

OBJECTS OF THE INVENTION

It is an object of this invention to provide an improved method and apparatus for air-exclusion gravity flow conduits, overcoming the aforementioned problems.

It is another object of this invention to provide an inlet valve control which will automatically maintain the subatmospheric flow condition and avoid surging over a wide range of flow rates.

It is a specific object of this invention to provide, in the aforenoted air-exclusion gravity flow type of system, a float type control which automatically adjusts to varying inlet flow rates while also automatically compensating for the vacuum forces as they develop so that the unit can continue to operate in a manner of a simple float control valve, and also maintain steady flow as the flow rates change.

It is another object of this invention to provide an automatically compensating inlet control for such gravity flow subatmospheric pressure shafts.

It is a further object of this invention to provide a simple float operated inlet control valve apparatus which automatically compensates for the vacuum developed in a gravity flow subatmospheric pressure shaft.

Other objects and advantages of the invention will become apparent upon reading the following detailed description and appended claims, and upon reference to the accompanying drawings.

SUMMARY OF THE INVENTION

In a system for conducting liquid from a reservoir to a lower elevation under a differential head sufficient to produce at least a partial vacuum in the conduit subjacent the reservoir, a float controlled valve adjusts the flow of liquid into the conduit and maintains a pool of liquid in the reservoir, thereby precluding entry of air into the upper portion of the conduit, with means responsive to the partial vacuum in the conduit subjacent the reservoir for automatically applying an upward force to the valve assembly to compensate for the downward force thereon due to the partial vacuum in the conduit.

BRIEF DESCRIPTION OF THE DRAWINGS

For a more complete understanding of this invention, reference should now be made to the embodiment illustrated in greater detail in the accompanying drawings and described below by way of an example of the invention.

DETAILED DESCRIPTION OF THE DRAWINGS INCLUDING PREFERRED EMBODIMENT

The invention, although of substantially broader scope, is conveniently illustrated by its use in an advantageous system for conducting overflow liquid sewage material from a near surface system to a deep tunnel conduit and temporary storage system. It should be understood, of course, that the invention is not necessarily limited to the particular embodiment illustrated herein.

Figures 1, 3:
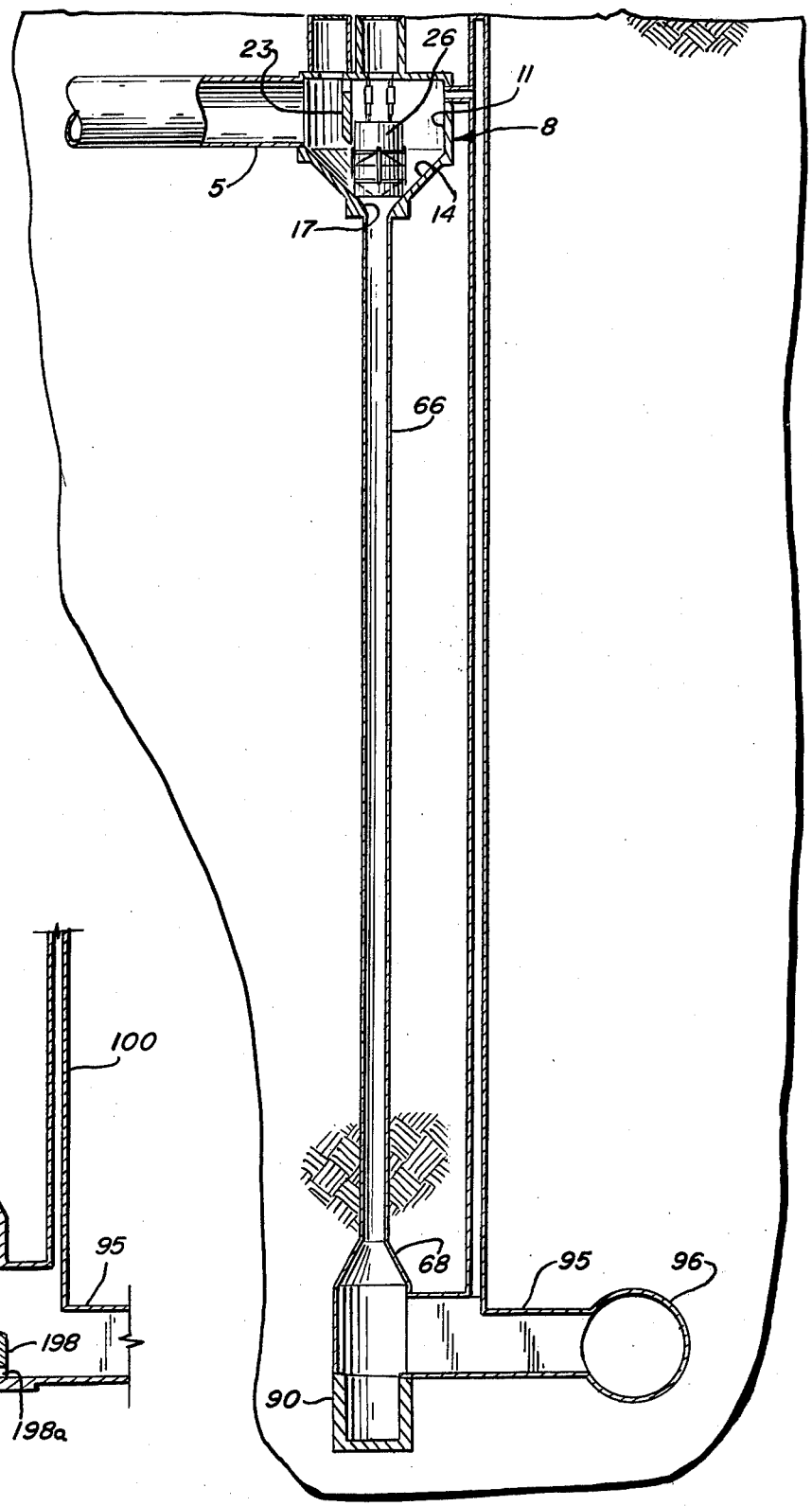
FIG. 1 is a central vertical cross sectional view of apparatus employing teachings of this invention, for conducting liquid downward through a subatmospheric pressure shaft in the earth from a surface sewer to a deep tunnel system.
FIG. 3 illustrates a nondepressed plunge pool, which is a preferable plunge pool design.

Turning first to FIG. 1, there is illustrated a cylindrical inlet reservoir 8 into which overflow liquid sewage material is conducted by gravity flow through the conduit 5 from a sewer system (not shown) and from which overflow sewage material is conducted by gravity flow, downward through the substantially vertical, cylindrical, subatmospheric pressure shaft 66 which is lined with steel well casing, and then into a plunge pool 90. From there, the material flows through the tunnel 95 and into the tunnel 96, both of which tunnels are constructed in subterranean rock. A valve assembly 26, including a cylindrical valve gate 29 automatically controls the flow from the reservoir 8 to the shaft 66.

Figure 2:
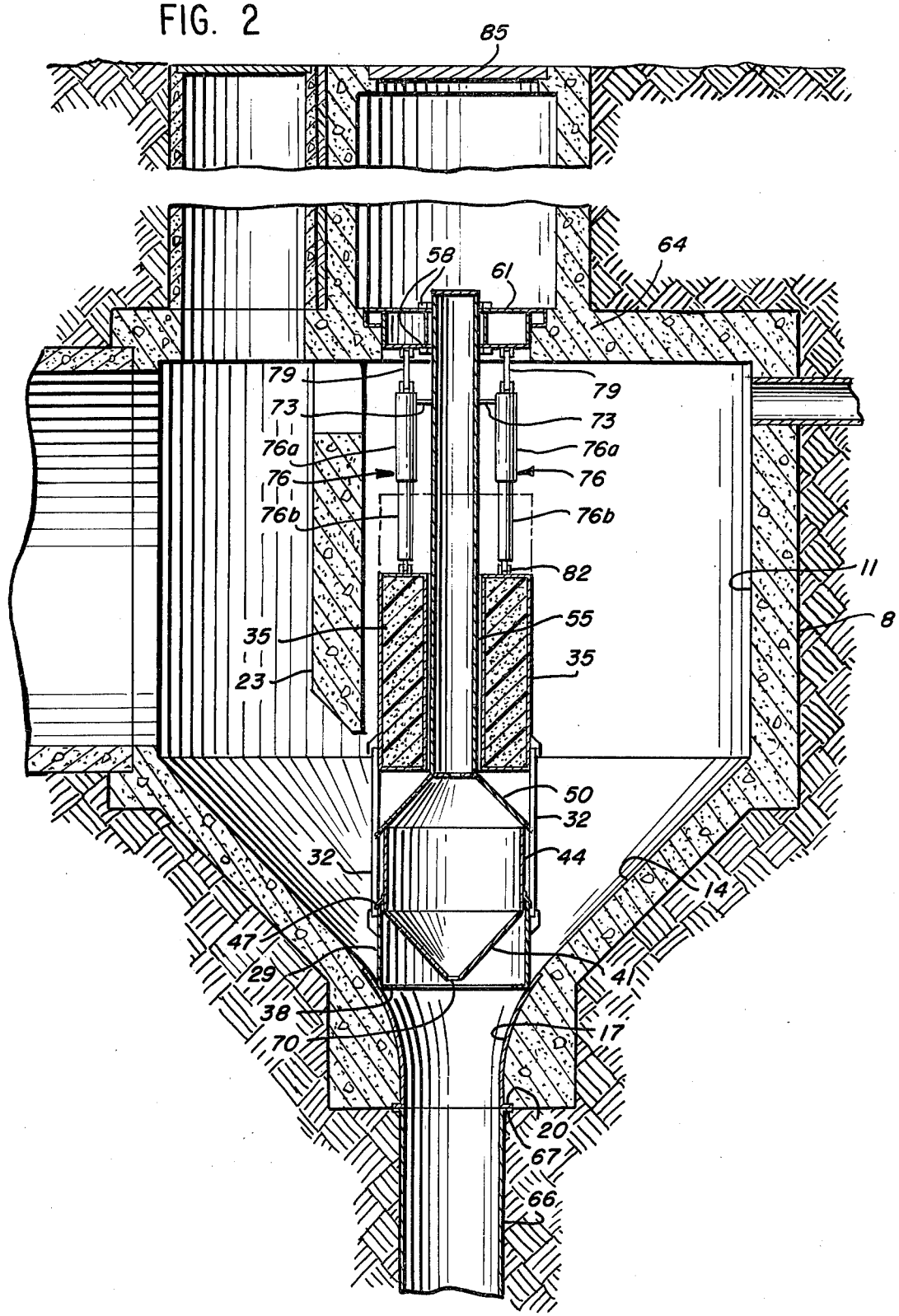
FIG. 2 is an enlarged central vertical cross sectional view of the inlet and control components of the apparatus of FIG. 1.

Referring to FIGS. 1 and 2 together, the reservoir 8 comprises a reinforced concrete sidewall 11 and a reinforced concrete conical surface 14, which is designed to conduct the flow to a bell mouth valve seat 17 and the shaft 66 below it and to have a sufficient downward slope to maintain a clean condition thereon even though the sewage material might contain debris which would tend to deposit on, and adhere to, a more horizontal surface.

The bell mouth valve seat 17 is a cast or ductile iron piece, with a flanged or similar mechanical connection 20 to the top 67 of the steel well casing used to line the shaft 66. The cast or ductile iron is used to provide corrosion and erosion resistance in the wet environment of the bell mouth valve seat 17, as well as to provide a hard surface on which the cylindrical gate 29 can seat. There is no particular need to have a close sealing fit between the bell mouth valve seat 17 and the gate 29, because a certain amount of leakage is desirable to provide a final drain of the reservoir 8 after cessation of flow thereinto and also because of the likelihood that objects in the sewage (rags, sticks, etc.) might become lodged between the gate 29 and the bell mouth valve seat 17 upon final closing thereof, thus preventing a tight seal. For both of these reasons, the bell mouth valve seat 17 need not be machined. With a shaft 66 having a diameter of 4 feet and gate 29 having a diameter of 6 feet, the leakage through the gate 29 and the maximum design flow capacity of the shaft 66 under a piezometric head differential of 50 feet are estimated to be about 3 cubic feet per second and about 500 cubic feet per second, respectively.

A baffle 23 is made from reinforced concrete or structural steel and serves to deflect large debris in the overflow sewage material from impinging directly upon a float 35 or other parts of the valve assembly 26. There is sufficient space between the underside of the baffle 23 and the conical surface 14 to accommodate the maximum capacity of the overflowing sewer system or the equivalent water conductor.

The valve assembly 26 controls the flow rate of sewage material entering the shaft 66, and includes a movable gate 29, support arms 32 and float 35, and stationary support and guide components 41, 44, 50 and 55. In the valve assembly 26, the gate 29 is connected by the arms 32 to the float 35. The gate 29 is raised to permit the flow of sewage material from the reservoir 8 into the shaft 66 and is lowered to limit such flow. In its lowest position, the gate 29 is seated on the bell mouth valve seat 17 and permits only seepage of liquid into the shaft 66. The gate 29 is cylindrically shaped in order to minimize that unbalancing effect of the varying pressures in the shaft 66, which can range from atmospheric to nearly a perfect vacuum. The gate 29 also has a small flange 38 at its bottom, for purposes of fortifying the gate 29 so as to keep it circular during operation. The gate 29 is fortified at its top by its proximity to the cylinder 44.

The arms 32 are structural members, several in number, to transmit the forces between the float 35 and the gate 29. The magnitude of these forces on the arms 32 is relatively small, generally being on the order of a few thousand pounds per arm. The arms 32 are shaped so as to minimize the possibility of debris in the sewage material being retained thereon.

The float 35 is donut shaped. The float 35 has approximately the same diameter as the gate 29 and provides sufficient buoyancy to carry the weight of the gate 29, the arms 32, the lower portions of pneumatic cylinder units 76, and a sealing member 47, as well as its own weight, preferably without requiring more than about 50 percent submergence of the height of the float 35. Since there is a degree of flexibility in sizing the float 35, the combined weight of the gate 29, arms 32, float 35, the lower portions of the cylinder units 76 and the sealing member 47 need not be narrowly restricted. When the level of overflow sewage material rises, the float 35 is buoyed up, raising the arms 32 and the gate 29. The gate slides upward along the exterior surface of cylinder 44. The float 35 is made of a noncorrosive material, for example fiberglass, and, if hollow, can be filled with a urethane foam to maintain buoyancy even though its surface might be punctured. The hollow support pipe 55 extends through the center of the float.

The cone 41 is a stationary part of the valve assembly 26 and is provided to streamline the passage of the overflow sewage material into the vertical shaft 66. When the gate 29 is raised by the float 35, the resulting passage is a streamlined one, with cone 41 systematically reducing the cross sectional area of the flow in the direction of flow. Together the bell mouth valve seat 17 and cone 41 are designed to provide a streamlined passage for the flow of the liquid at design flow capacity, that is, minimum flow restriction and pressure head loss.

The cone 41 is connected at its upper end to the lower end of the cylinder 44. The cylinder 44 provides a smooth and corrosion resistant surface and can be made of stainless steel. A sealing member 47 is attached to the upper end of the cylinder 29 and is designed to slide along the face of the cylinder 44 and to bridge the gap between the cylinder 29 and the cylinder 44, thus keeping particles of sewage and debris carried in the sewage material from entering the space between the cylinder 29 and the cylinder 44. The material from which the sealing member 47 is fabricated should be selected to provide the required strength, resistance to corrosion, and low coefficient of friction. Preferably, the sealing member 47 is made from spring brass or nylon or similar flexible material.

The upper end of the cylinder 44 is attached to the lower end of the cone 50 which overhangs the cylinder 44 and is sloped so as to prevent particles in the overflow sewage material from being deposited on its surface.

The upper end of the cone 50 is attached to the lower end of the pipe 55 which is the structural support for the cones 41 and 50 and the cylinder 44. The pipe 55 is designed to resist the strong downward force applied to it by virtue of the vacuum in the shaft 66, and the random bending moments which would result from the impact of logs and other debris which might be brought into the reservoir 8 with the overflow sewage material. The pipe 55 is supported at its top to the bulkhead 61 through the welding flanges 58. The welding flanges 58 at the top of the pipe 55 are used for welding the pipe 55 to the bulkhead 61 from which the pipe 55 is supported. The welding flanges 58 are particularly useful for the final welding of the pipe 55 to the bulkhead 61 in the field, in order to accommodate for errors made in alignment when installing the assembly. The bulkhead 61 is designed to support all of the component attached to it and which, in turn, is supported in the concrete structure 64. Moreover, the bulkhead 61 is a removable structural member, whereby the entire valve assembly may be prefabricated and installed and/or removed as a unit.

The cone 41 has at its bottom a small opening 70 which permits the same pressure which exists in the shaft 66 under the various flow conditions to be transmitted to the interior of the structure composed of the parts 41, 44, 50 and 55. This pressure is then transmitted by means of flexible hoses 73 to stabilizing pneumatic cylinder units 76 to provide a counterbalancing force. Stabilizing cylinder units 76 are machined hydraulic cylinders and mating pistons with "O" ring seals therebetween. The stabilizing cylinders 76a are attached to the bulkhead 61, and the mating pistons 76b are attached to the float 35 through somewhat flexible connections 79 and 82, respectively, in order to allow for a limited rotational movement of the float 35 on the pipe 55. The cylinder units have a combined cross-sectional area equal to the combined area in plan of the gate 29 and the associated annular space between the gate 29 and the cylinder 44. By equating these areas and providing for communication of the subatmospheric pressure area beneath the intake valve with the cylinder units, the effect of the development of subatmospheric pressures in the shaft 66 is nullified insofar as the vertical forces and positioning of the float 35 is concerned. The stabilizing cylinders 76 are lined up in a nearly vertical position at the time of the installation of the entire assembly and before the welding of the flanges 58 in place. In order to have effective transmission of the subatmospheric pressures from the shaft 66 to the stabilizing cylinders 76, the structure composed of the parts 41, 44, 50 and 55, 73 and 76 must be airtight and tested for airtightness prior to installation or operation.

The entire assembly of components 41, 44, 47, 50, 55, 58, 61 and 76, along with the associated parts 29, 32 and 35 is inserted and removed through the hatch 85, as by means of a mobile crane. The hatch 85 is provided for installation and removal of the entire assembly and has a small access hole (not shown) in it with a ladder to the level of the top of the bulkhead 61 and is vented to the atmosphere.

A plunge pool 90 is provided at the base or outlet 68 of the shaft 66 for dissipation of the energy of the material flowing rapidly from the outlet 68 of the shaft 66. The plunge pool 90 is designed to dissipate the energy due to material flowing through the shaft 66 at as high as 750 cubic feet per second, which is equivalent to about 87,000 pounds of momentum for a shaft 66 of 4 feet diameter. The plunge pool 90 provides a resistance equivalent to momentum and would typically have a diameter of 16 feet and a depth of 7.5 feet. The plunge pool 90 drains by gravity into the tunnel system 95.

FIG. 3 illustrates an alternative plunge pool 190, the plunge pool 190 is of nondepressed design to permit complete draining of the pool into the tunnels 95 and 96 by gravity. A baffle 198 assures retention of fluid under flow conditions to form the plunge pool, while a bottom drain hole 198a permits complete gravity drainage when inflow ceases.

A separate air vent line 100 also preferably is provided and may be drilled and lined at the same time as the main shaft 66. The secondary shaft 100 connects with the tunnel system 95, the inlet reservoir 8 and the surface, as schematically illustrated. The shaft 100, e.g., of 24" diameter in the aforementioned exemplary design, serves as an alternative access during construction, such as for air flow, and meets requirements of an alternate escape route from the subjacent cavities. This shaft also will serve as a vent, to vent air forced from the shaft 66 and from the subjacent cavities and connecting tunnels as they fill with liquid.

In operation, overflow sewage material from a sewer system enters the inlet reservoir 8. If the flow rate of sewage material into the reservoir 8 is very small, the overflow material leaks through the imperfect seal between the cylinder 29 and bellmouth valve seat 17. As the flow rate of the material into the reservoir 8 increases, it exceeds the rate of leakage due to the imperfect seal between the cylinder 29 and the bell mouth valve seat 17, and the overflow sewage material accumulates in the reservoir 8 in the volume around the valve assembly 26.

As the level of the sewage material in the reservoir 8 rises, material therein exerts a small pressure on the sealing member 47 which increases the friction between the sealing member 47 and the cylinder 44. This friction tends to reduce any tendency of the valve assembly 26 to oscillate. When the level of the sewage material in the reservoir 8 increases further and submerges the float 35 to such an extent that the weight of the valve float system and the frictional force of the sealing member 47 are overcome by the buoyancy of the float. The cylinder 29 is raised, thereby creating an opening between gate 29 and seat 17 through which the sewage material can flow and enter the shaft 66.

The flow through the shaft 66 educes any air in the shaft and causes a partial vacuum to develop in the shaft 66. The partial vacuum in the shaft 66 causes the flow rate into the shaft 66 to increase further. The cylinder units 76 and communicating air passages compensate for the downward force effect of the vacuum on the valve structure. When the increased flow rate into the shaft 66 equals the flow rate of sewage material into the reservoir 8, the float 35 and the cylinder 29 stop rising, and equilibrium is achieved, with a steady rate of flow and the intake at valve gate 29 remaining submerged to exclude air.

In such an equilibrium situation, the partial vacuum in the shaft 66 causes an increase in the frictional force of the sealing member 47 against the cylinder 44, thus tending to stabilize the position of the movable valve system consisting of the float 35, arms 32, and gate 29. Under such condition, this movable system would further raise or lower only if the level of sewage material in the reservoir 8 raised or dropped sufficiently so that the difference between the weight of the system and the buoyancy of the float 35 is greater than the frictional force between the sealing member 47 and the cylinder 44. Thus, the float system does not rise or lower with small oscillations in the level of the overflow sewage material in the reservoir 8, but tends to remain in a given position until there is a significant or sustained difference between the flow rates of the overflow sewage material into and out of the reservoir 8 to require an adjustment.

The horizontal forces exerted on the gate 29 as a result of the vacuum in the shaft 66 are absorbed mainly in the form of ring compression. By way of example, with the shaft 66 having a diameter of 4 feet, the diameter of the gate 29 would be about 6 feet, and its height would be about 2.5 feet. The maximum differential pressure head acting on the cylinder 29 would be generally about 50 feet of water, or about 3,125 pounds per square foot. Spread over the 2.5 foot height of the cylinder 29, this maximum differential pressure head would be 7,812 pounds per square foot and would accumulate in the 3 foot radius of the cylinder 29 to 23,436 pounds of ring compression, or only 3,125 pounds per square inch for a cylinder with a thickness of ¼ inch, normally the minimum thickness for the cylinder 29, which is a relatively small force for a cylinder of this size.

There would also be a downward force on the cylinder 29 resulting from the development of a vacuum in the shaft 66 in addition to the load from the water in the reservoir 8. This force would also be 3,125 pounds per square foot, acting on the area of the cylinder 29 projected in plan. In the foregoing example, the minimum area would be a circular ring with a thickness of ¼ inch plus 3/16 inch clearance or 7/16 inch for the net plan area of the friction element 47, multiplied by the circumference of about 19 feet. This area would then be 0.68 square feet, and the corresponding downward force would be 2,125 pounds. About two thirds of this force would develop suddenly as the vacuum developed in the shaft 66, tending to offset the effect of the buoyancy of the float 35.

At the same time, however, there would develop a frictional resistance of the sealing member 47 on the cylinder 44 which would tend to resist the downward pull of the vacuum in the shaft 66. The total pressure differential on the sealing member 47 would also be 3,125 pounds per square foot. This would represent a combined normal force of about 4,882 pounds, assuming that there would be an effective one inch of seal between the sealing member 47 and the cylinder 44 which is subjected to the pressure differential. Assuming a coefficient of friction of 0.2 between the sealing member 47 and the cylinder 44, the resisting frictional force therebetween would be 976 pounds. This is less than the incremental force of 1,400 pounds pulling downward, the net result being a 400 pound force pulling downward. This would cause the float 35 to move downward to pick up the additional buoyancy. For the float 35 having an area of 28 square feet, the additional 400 pounds of buoyancy would be picked up with an additional 2.7 inches of submergence.

Since this amount of downward motion would probably be sufficient to close the initial opening of the cylinder 29, the stabilizng cylinders 76 are provided and are designed to exactly offset the effect of the vacuum suddenly developing in shaft 66 and acting on the narrow circular ring comprised on the top of the gate 29 plus the sealing member 47. With the aforenoted exemplary dimensions, the total cross-sectional area of the pneumatic cylinders 76 would then also be 0.68 square feet. Thus, as a vacuum pressure suddenly develops in the shaft 66 and applies a downward force to the valve gate, a corresponding reduced pressure would be applied simultaneously to the cylinder units 76, with a resulting compensating opposite force in an upward direction on the float 35 and thus on the gate 29.

This compensating force eliminates the problem of oscillation and unsteady or surging flow which would otherwise develop in the valve assembly 26 due to sudden draw down of the valve when the vacuum condition develops. The system is balanced for proper response of the float control to the level of liquids in the reservoir 8 whereby the outflow rate automatically is adjusted in accordance with varying inflow rates. Moreover, the intake valve remains submerged at all times over all rates of flow above leakage flow to exclude air whereby the high rates of flow by the subatmospheric operation is maintained and surging or unsteady flow is avoided.

Also, since the downward pull on the gate 29 as a result of the vacuum developed in the shaft 66 is offset by the same vacuum acting on the pneumatic cylinders 76, but in the opposite direction, the frictional force between the sealing member 47 and the cylinder 44 is available to provide the full further stabilizing effect which it was designed to provide as noted above. Assuming the example of a float 35 having a diameter of 6 feet with a cross-sectional area of 28 square feet, the buoyancy would be approximately 1,767 pounds per foot of submergence. With the float 35 having a height of 8 feet, a submergence of 50% of the height of the float 35 provides a force of 7,068 pounds. This force would be sufficient to carry the weight on the float 35. It would require 0.55 feet of submergence to develop the added buoyance to equal the frictional force of the sealing member 47 on the cylinder 44 of 976 pounds, in the example described above. Thus, once the gate 29 has opened and the vacuum has developed, the float 35 would not move further until the water level has varied at least about 0.55 feet.

The shaft 66, as well as the secondary shaft 100, may be formed by known construction techniques, e.g., such as are employed in drilling wells. Shaft 66 is a simple, open cylindrical shaft. It must be of sufficient vertical length from its inlet to its outlet to accomplish two related effects. The shaft 66 must flow full with the liquid over a portion of its lower length, below a pressure drop zone immediately beneath the inlet opening. The full conduit flow prevents ventilation of the pressure drop zone by reverse flow of air upward through the shaft 66. Moreover, the full flow portion beneath the pressure drop zone must be of an appropriate length to draw a sufficiently strong vacuum, that is, enough to reduce the absolute pressure substantially below atmospheric pressure. Such flow conditions can be established simply by providing a shaft 66 of adequate length, for example, substantially greater than the atmospheric pressure head, with due allowances relative to its diameter and frictional characteristics and to the characteristics of the liquid material, and by providing an adequate inflow supply of the liquid to the receiver 8.

For example, it is presently believed that in the 4 foot diameter shaft 66 described above and considering frictional losses, the vertical height over which liquid drops in the shaft 66 should be preferably at least 30 feet in order to achieve significant pressure reduction by gravity and attendant high rates of flow. The total head available from the liquid level in the reservoir 8 to the piezometric level in the conduit 66 is available for moving liquid through the shaft 66. Increased flow through the shaft can be achieved with a greater head. For example, with a piezometric head of 50 feet between the liquid level in the reservoir 8 and the piezometric level in the shaft 66, and assuming that the inlet head loss, shaft friction loss and exit head loss equal 0.2, 1.2 and 1.0 times the velocity head, respectively, the velocity head and corresponding flow rate of the aforenoted exemplary 4 feet shaft system can be calculated as 20.83 feet per second and 460 cubic feet per second, by applying the law of conservation of energy. Under conditions of maximum flow, the flow capacity can be further increased to about 750 cubic feet per second in the shaft 66 by employing, for example, a shaft 66 having a length and piezometric head of about 82 feet, beyond which further benefits are prevented by cavitation.

It will be apparent that other embodiments may be made utilizing teachings of this invention. For example, the preferred apparatus and method of this invention are described above in terms of a system in which the shaft 66 extends vertically downward. However, the shaft 66 need not be vertical so long as its effective vertical height and the total head available are sufficient to effect the conditions and operation described above. Further, the entrance to the shaft 66 need not be in the bottom of the reservoir 8 but can also be located in a lower portion of a side wall of the reservoir 8. In addition, the reduced pressure in the shaft 66 subjacent the reservoir 8 can be sensed and transmitted by various means to generate compensating opposite forces on the valve assembly 26 by various transducers. In short, wide variations in the physical configuration and dimensions of the system and in the flow rate of liquid through the shaft 66 are contemplated for this invention. However, the illustrated system which utilizes direct communication of the vaccum pressure through the structural components is preferred because of its simplicity, unitary design and avoidance of any need for external power sources or sophisticated transducers. The method of this invention is apparent from the foregoing description of the operation and advantages of the disclosed embodiments.

While the apparatus and method of this invention are described above in terms of a system for conducting overflow sewage material from a sewer system to a tunnel system at a lower elevation, it is of course understood that the invention is not limited thereto and its scope is defined by the claims which follow. The present invention clearly extends to any system for transporting liquid from a reservoir through a downwardly extending subatmospheric pressure shaft to a lower elevation.

What is claimed is:

1. A process for conducting liquid from a first elevation to a lower elevation through a closed gravity flow conduit comprising:
    flowing the liquid from a reservoir at the first elevation past a valve assembly in said reservoir, and into and downward in a closed conduit by gravity, producing by such downward flow in said conduit, at least a partial vacuum subjacent said reservoir;
    adjusting said valve assembly in response to the level of liquid in said reservoir to control the flow of liquid from said reservoir into said conduit and to maintain a pool of liquid in said reservoir, thereby precluding entry of air into the upper portion of said conduit; and
    applying a continuously variable, upward force on said valve assembly to compensate the downward force thereon due to the vacuum therebeneath in said conduit, said upward force being applied automatically in response to the vacuum in said conduit subjacent said reservoir.

2. The process of claim 1 wherein a portion of liquid in said reservoir is subjected to superatmospheric pressure in a first zone in said reservoir and liquid is conducted from said first zone in said reservoir into said conduit.

3. The process of claim 2 wherein the superatmospheric pressure in said first zone in said reservoir is equal to a pressure head of about 10 feet of water.

4. The process of claim 1 wherein the liquid flows vertically downward from said reservoir and into said conduit.

5. The process of claim 1 wherein the pressure within said conduit is at nearly absolute zero pressure subjacent said reservoir during such flow therethrough.

6. The process of claim 1 wherein the downward flow of liquid in said conduit provides full flow of liquid in a zone of said conduit extending over a lower portion of the length thereof.

7. The process of claim 1 wherein the compensating force applied to said valve assembly permits said valve assembly to adjust the flow of liquid into said conduit in response substantially solely to the level of liquid in said reservoir.

8. The process of claim 1 wherein the partial vacuum in said conduit subjacent said reservoir is transmitted to at least one hydraulic cylinder which applies the compensating force to said valve assembly.

9. The process of claim 1 wherein liquid flows continuously into said reservoir and said valve assembly maintains the flow rate of liquid into said conduit equal to the flow rate of liquid into said reservoir.

10. The process of claim 1 wherein the liquid is overflow sewage material which flows by gravity from a sewer to said reservoir and which is conducted through said conduit to a tunnel system at a lower elevation.

11. The process of claim 10 wherein said valve assembly maintains the flow rate of sewage material into said conduit equal to the flow rate of sewage material into said reservoir.

12. The process of claim 10 wherein sewage material is discharged from said conduit into a plunge pool from which sewage material drains by gravity into the tunnel system and which dissipates the kinetic energy of sewage material being discharged from said conduit.

13. In combination with a reservoir for liquid and a downwardly extending closed conduit for flowing liquid from said reservoir to a lower elevation by gravity under a differential head sufficient to produce reduced pressure in said conduit below said reservoir; the improvement comprising a movable valve for controlling the flow of liquid from said reservoir into said conduit and including portions subjected to a seating force upon occurence of a pressure reduction in said conduit, means for providing a positioning force on said valve in accordance with the level of liquid in said reservoir to control the flow rate therepast and maintain a pool of liquid in said reservoir, thereby precluding entry of air into the upper portion of said conduit; and means responsive to the reduced pressure subjacent said reservoir for automatically applying further continuously variable opening force on said valve to compensate the closing force thereon due to said reduced pressure in the conduit.

14. The improvement of claim 13 wherein said positioning force means includes a float member in said reservoir and connected to said valve for adjusting said valve in accordance with the level of liquid in said reservoir.

15. The improvement of claim 13 wherein said means for applying the compensating force to said valve comprises at least one hydraulic cylinder to which the partial vacuum subjacent said reservoir is transmitted.

16. The improvement of claim 15 including a central support structure associated with said valve, said support structure being hollow and in communication with said hydraulic cylinder and with said conduit beneath said valve for so transmitting such partial vacuum.

17. The improvement of claim 13 wherein said conduit extends vertically downward directly from said reservoir.

18. The improvement of claim 17 wherein said valve is a cylinder with a vertical central axis, said positioning force means including a float member in said reservoir and connected to said valve for adjusting said valve in accordance with the level of liquid in said reservoir, and said means for applying the compensating force to said valve comprises at least one hydraulic cylinder to which the partial vacuum subjacent said reservoir is transmitted.

19. The improvement of claim 13 wherein the compensating force applied to said valve permits said positioning force means to adjust said valve in response substantially solely to the level of liquid in said reservoir.

20. The improvement of claim 13 wherein liquid flows continuously into said reservoir and said valve maintains the flow rate of liquid into said conduit equal to the flow rate of liquid into said reservoir.

21. The improvement of claim 13 wherein said conduit has a vertical length from its inlet to its outlet which is in excess of the atmospheric pressure head and which is sufficient to provide full flow of liquid in a second zone thereof extending over a portion of the lower length thereof, said second zone being of sufficient length to effect at least a partial vacuum in a first zone thereof subjacent said reservoir.

22. The improvement of claim 21 wherein the vertical length of said conduit from inlet to outlet is at least 30 feet.

23. The improvement of claim 22 wherein said vertical length is at least 50 feet.

24. The improvement of claim 13 wherein said reservoir includes means for streamlining the flow of liquid from said reservoir into said conduit.

25. The improvement of claim 13 wherein said reservoir is positioned to receive overflow sewage material which flows by gravity from a sewer to said reservoir, and said conduit is in communication with a tunnel system at a lower elevation to receive such sewage material.

26. The improvement of claim 25 wherein said positioning force means is responsive to the level of material in said reservoir whereby the flow rate of sewage material into said conduit equals the flow rate of sewage material into said reservoir.

27. The improvement of claim 26 including a plunge pool into which sewage material is discharged from said conduit, from which sewage material is conducted by gravity flow into the tunnel system and which dissipates the kinetic energy of sewage material being discharged from said conduit.

28. In combination with a reservoir and a conduit for flowing liquid from said reservoir to a lower elevation by gravity under a differential head sufficient to produce a partial vacuum subjacent the inlet from said reservoir to said conduit, an adjustable valve for controlling the flow from said reservoir into said conduit, a float member in said reservoir and connected to said valve for adjusting said valve in accordance with the level of liquid in said reservoir, and means responsive to the pressure in said inlet to said conduit for automatically producing a continuously variable upward force on said valve compensating for the downward force imposed on said valve by such development of the partial vacuum subjacent said inlet to said conduit.

* * * * *